Patented Aug. 7, 1934

1,969,678

UNITED STATES PATENT OFFICE 1,969,678

FERRIC CHLORIDE ETCHING SOLUTIONS

Arthur C. White and Sylvia M. Stoesser, Midland, Mich., assignors to The Dow Chemical Company, Midland, Mich., a corporation of Michigan No Drawing. Application September 25, 1931, Serial No. 565,195

18 Claims. (Cl. 41—42)

The present invention concerns, as indicated, ferric chloride solution compositions having improved etching properties and methods of conditioning ferric chloride solutions which are unsatisfactory for use in etching.

Solutions of ferric chloride in water are employed for etching metals, e. g., copper, to produce printing plates and rolls, such as those used in modern photo-engraving and rotogravure processes. Difficulty has been encountered in the use of some available ferric chloride solutions which give, in use, varying degrees of satisfaction as regards smoothness and speed of etch, some solutions producing a smooth etch, others a rough etch. The difficulty is met with chiefly in the range of the specific gravity of solutions between 40° and 50° Bé. and the invention herein concerns particularly solutions in that gravity range, although not restricted to such range. The invention has especial regard to improved etching compositions and methods of treating unsatisfactory ferric chloride etching solutions to condition them for satisfactory use.

To the accomplishment of the foregoing and related ends, the invention, then, consists of the method and features hereinafter fully described and particularly pointed out in the claims, the following description setting forth in detail several modes and compositions for carrying out the invention, such disclosed modes and compositions illustrating, however, but several of various ways in which the principle of the invention may be used.

Careful comparisons of chemical analyses of satisfactory and unsatisfactory solutions gave no clue to the cause of rough vs. smooth etching properties, and accordingly a very large number of additive ingredients were tested in varying additive proportions, etchings being made with them a sufficient number of times in succession to ascertain the effect of the additions or treatments used. Out of the large number of tests made, a minor percentage, only, gave satisfactorily improved results.

The research disclosed that only those solutions of unsatisfactory untreated ferric chloride to which had been added a minor percentage of a sulphate of a metal above hydrogen in the electromotive series, or which included such a minor percentage after treatment, gave satisfactory results. Based on a 47° Bé. gravity solution, the addition for example of 4 to 6 per cent by weight of ferric sulphate crystals was effective when the solution was again adjusted to 47° Bé. A further improvement of such a solution was secured by adding a small percentage of a dispersing agent such as a sugar, e. g., glucose, dextrose, etc., or glue or gum arabic. It was found that for the above stated solution an addition of not less than ½ of 1 per cent of commercial glucose or equivalent was effective. It was found also advisable in some instances to treat the solution with chlorine or other suitable oxidizing agent such as chromic acid, ammonium persulphate or potassium permanganate in an amount sufficient to convert any ferrous iron present to ferric iron. An excess of such oxidizer should be avoided. However, if instead of using a sugar, glue or gum arabic and chromic acid or equivalent, there be added ferric bromide conveniently in solution of 47° Bé. specific gravity, say 4 to 6 per cent, the same results may be obtained, the ferric sulphate, however, being present. To summarize, the following solutions were found to be satisfactory, all being prepared from a ferric chloride solution which gave a rough etch before treatment.

1. A 47° Bé. solution of the unsatisfactory chloride containing about 5 per cent ferric sulphate, 1.5 per cent glucose, to which .2 per cent chromic acid had been added, and having the specific gravity adjusted to 47° Bé. was prepared and tested, giving good results.

2. To an unsatisfactory 47° Bé. ferric chloride solution was added ferrous sulphate which was then oxidized with chlorine. The resulting solution had a specific gravity of 47° Bé. and a content of 4 to 5 per cent ferric sulphate. A little glucose was added but no chromic acid. Results good.

3. To 95 cc. of a 47° Bé. solution of the unsatisfactory chloride was added 4 to 5 per cent of ferric sulphate crystals, 5 cc. of 47° Bé. ferric bromide solution and the specific gravity adjusted to 47° Bé. Results good. (The addition of a little chromic acid did not improve the results.)

Other metallic sulphates may be used instead of ferric sulphate, in general, a sulphate of a metal above hydrogen in the electromotive series may be so used, e. g. aluminum sulphate.

The invention will accordingly be seen to include compositions comprising ferric chloride and additive ingredients, the resulting solution having smooth etching properties, and methods of conditioning an unsatisfactory solution of ferric chloride to improve its etching qualities.

The above listed compositions are for 47° Bé. solution. Ferric chloride solutions of various strengths are employed for etching. The treatments herein disclosed and those compositions stated are applicable to any solution, but particularly in the range 40° to 50° Bé. The ferric bromide may vary in amount although 4 to 6 per cent has been found satisfactory. The sugar or equivalent may be present in amount preferably not less than about ½ per cent, also preferably less than 3 per cent, and chromic acid be added in amount about .2 per cent, if used.

Where in the claims the expression an organic dispersing agent is used it shall be understood to cover a sugar, glue, glycerine, gum arabic, dextrose, tannic acid, or the equivalent.

Instead of oxidizing with chlorine or chromic acid, a permanganate, e. g. $KMnO_4$, or a persulphate, e. g. $(NH_4)_2S_2O_8$, may be used.

Although in most compositions tested ferric sulphate was used as the soluble metal sulphate, a number of test compositions were tried out in which other soluble sulphates of other metals above hydrogen in the electromotive series were substituted for the ferric sulphate. Among the other metals tested were sodium, aluminum, potassium, nickel, and magnesium. These tests indicated that the soluble sulphates of all the so named metals were effective in varying degrees, but that ferric sulphate being cheap and most effective, was the preferable salt to use.

Other modes of applying the principle of our invention may be employed instead of the one explained, change being made as regards the method or ingredients herein disclosed, provided the step or steps or ingredients stated by any of the following claims or the equivalent of such ingredients, or stated step or steps be employed.

We therefore particularly point out and distinctly claim as our invention:—

1. An etching composition comprising a water solution of ferric chloride, a minor percentage of a water-soluble sulphate of a metal above hydrogen in the electromotive series, and containing a sugar in solution.

2. An etching composition comprising a water solution of ferric chloride and a minor percentage of ferric sulphate and of an organic dispersing agent, the composition having a gravity between 40° and 50° Bé.

3. An etching composition comprising a water solution of ferric chloride and from 4 to 6 per cent of ferric sulphate together with a minor percentage of an organic dispersing agent.

4. An etching composition comprising a water solution of ferric chloride and from 4 to 6 per cent of ferric sulphate together with from ½ to 3 per cent of an organic dispersing agent.

5. An etching composition comprising a water solution of ferric chloride and from 4 to 6 per cent of ferric sulphate together with from ½ to 3 per cent of an organic dispersing agent, the composition having a gravity between 40° and 50° Bé.

6. An etching composition comprising a water solution of ferric chloride and from 4 to 6 per cent of ferric sulphate together with a minor percentage of a sugar.

7. An etching composition comprising a water solution of ferric chloride and a minor percentage of ferric sulphate to which an oxidizer has been added in amount sufficient to oxidize ferrous compounds present.

8. An etching composition comprising a water solution of ferric chloride and a minor percentage of ferric sulphate to which an oxidizer has been added in amount sufficient to oxidize ferrous compounds present, the solution having a gravity between 40° and 50° Bé.

9. An etching composition comprising a water solution of ferric chloride and a minor percentage of ferric sulphate to which chromic acid has been added.

10. An etching composition consisting of a water solution of ferric chloride and a minor percentage of ferric sulphate to which composition chromic acid has been added, the solution having a gravity between 40° and 50° Bé.

11. An etching composition consisting of a water solution of ferric chloride, a minor percentage of a water-soluble sulphate of a metal above hydrogen in the electromotive series and a smaller amount of an organic dispersing agent.

12. An etching composition consisting of a water solution of ferric chloride, a minor percentage of a water-soluble sulphate of a metal above hydrogen in the electromotive series, a smaller amount of an organic dispersing agent, and having a gravity between 40° and 50° Bé.

13. An etching composition comprising a water solution of ferric chloride which contains a minor percentage of ferric sulphate and of glucose.

14. An etching composition comprising a water solution of ferric chloride which contains from 4 to 6 per cent of ferric sulphate and a minor percentage of glucose, the solution having a gravity between 40° and 50° Bé.

15. An etching composition comprising a water solution of ferric chloride which contains from 4 to 6 per cent of ferric sulphate and from 0.5 to 3 per cent of glucose, the solution having a gravity between 40° and 50° Bé.

16. An etching composition comprising a water solution of ferric chloride which contains a minor percentage of ferric sulphate and of an organic dispersing agent, and to which an oxidizer has been added in amount sufficient to oxidize ferrous compounds present.

17. An etching composition comprising a water solution of ferric chloride which contains a minor percentage of ferric sulphate and of glucose, and to which an oxidizer has been added in amount sufficient to oxidize ferrous compounds present.

18. An etching composition comprising a water solution of ferric chloride which contains from 4 to 6 per cent of ferric sulphate and a minor percentage of glucose and to which a small amount of chromic acid has been added, the solution having a gravity between 40° and 50° Bé.

ARTHUR C. WHITE.
SYLVIA M. STOESSER.